R. L. & F. J. FRINK.
BAIT FOR DRAWING GLASS.
APPLICATION FILED MAR. 10, 1910.
972,687.
Patented Oct. 11, 1910.
3 SHEETS—SHEET 1.
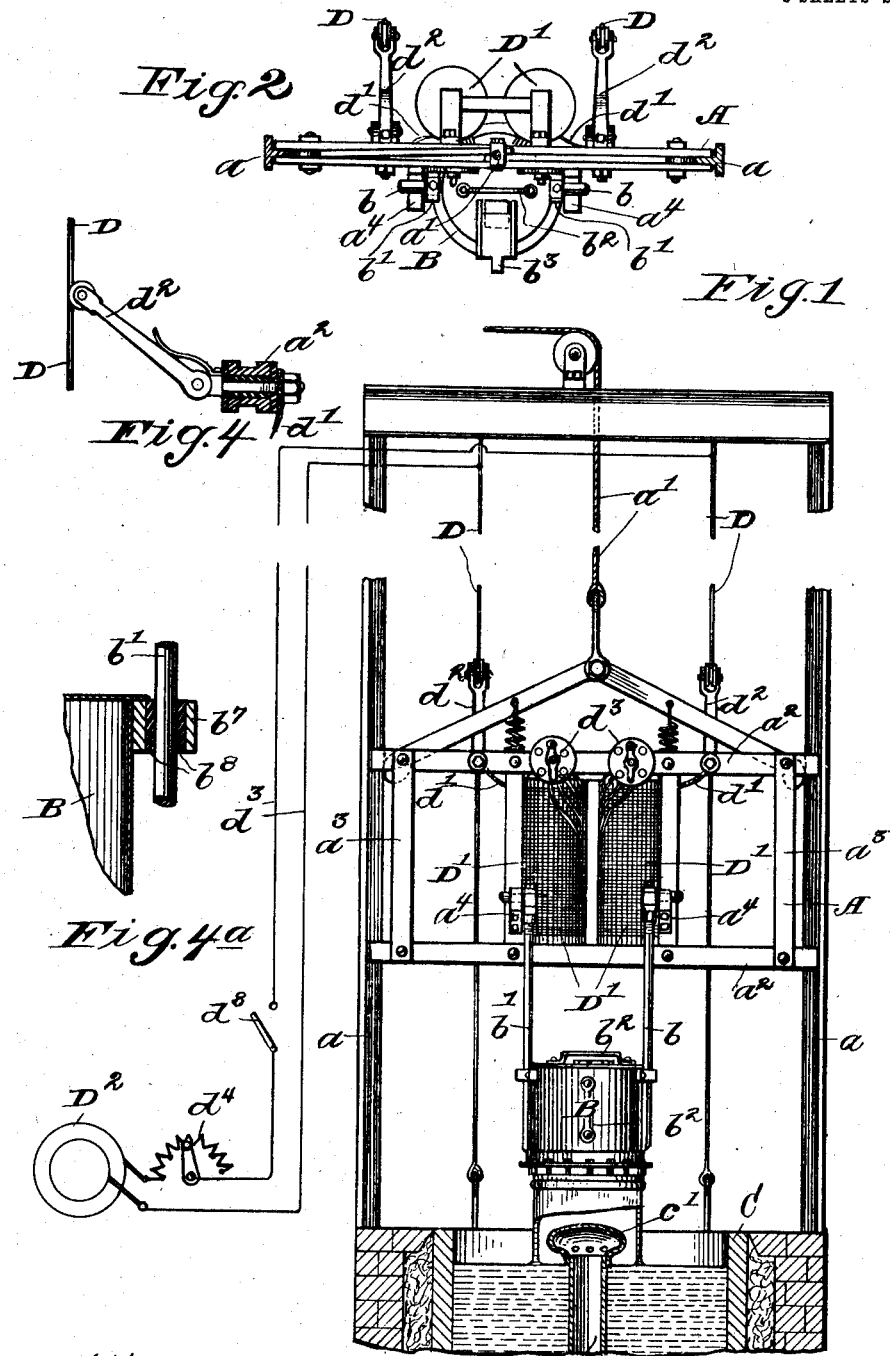
Witnesses.
Mary Gladwell
Jno. F. Ohulin
Inventors:—
Robert L. Frink and Fred J. Frink
by J. B. Fay
Attorney

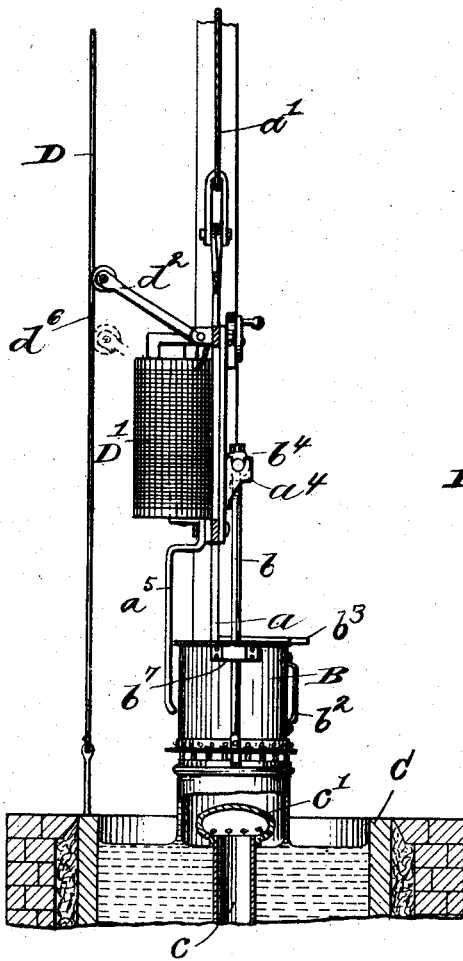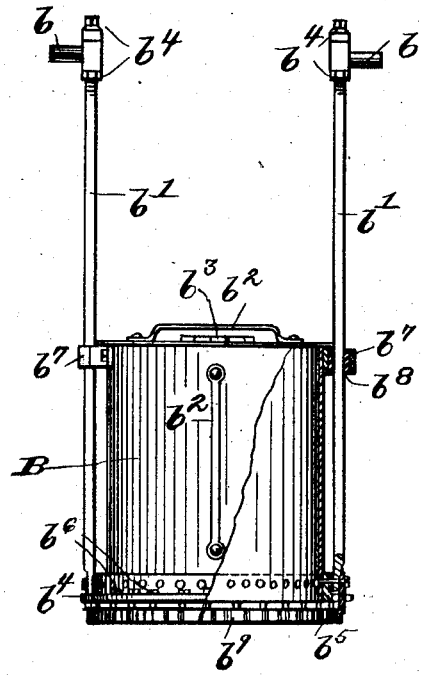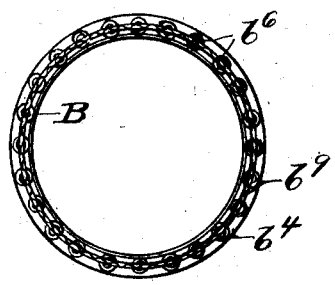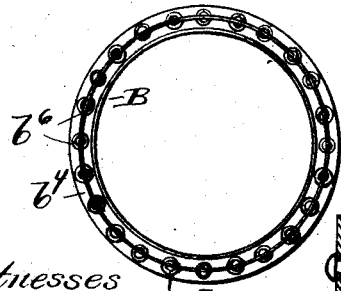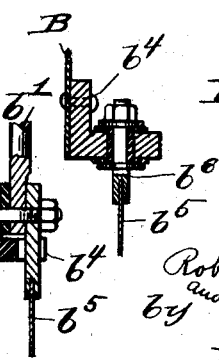

R. L. & F. J. FRINK.
BAIT FOR DRAWING GLASS.
APPLICATION FILED MAR. 10, 1910.
972,687.
Patented Oct. 11, 1910.
3 SHEETS—SHEET 3.
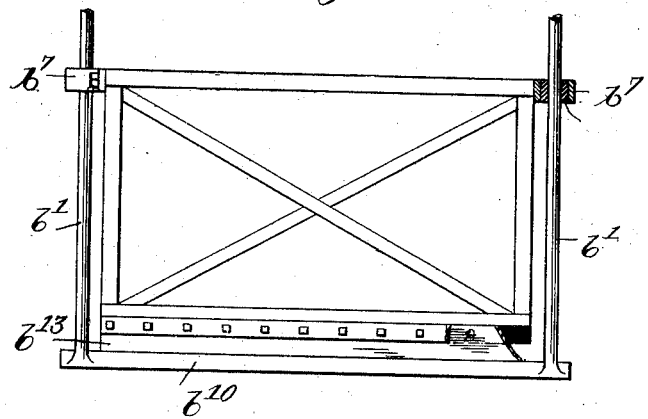
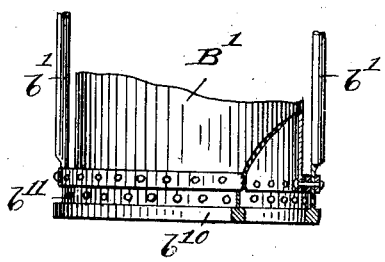 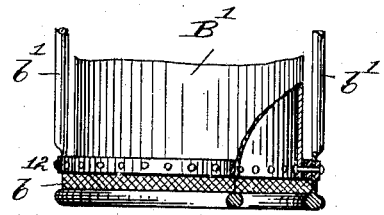
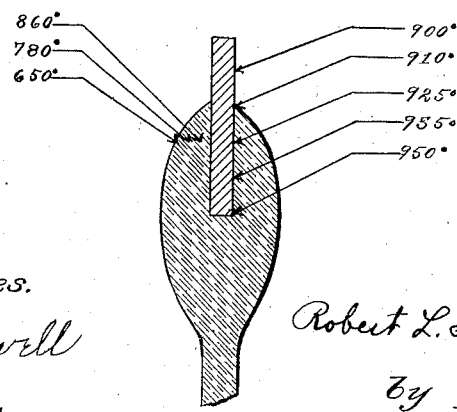
Witnesses.
Mary Gladwell
Jno. F. Oberlin
Inventors.
Robert L. Frink and Fred J. Frink
by J. B. Fay
Attorney.

UNITED STATES PATENT OFFICE.

ROBERT L. FRINK AND FRED J. FRINK, OF LANCASTER, OHIO.

BAIT FOR DRAWING GLASS.

972,687.  Specification of Letters Patent.  Patented Oct. 11, 1910.

Application filed March 10, 1910. Serial No. 548,490.

*To all whom it may concern:*

Be it known that we, ROBERT L. FRINK and FRED. J. FRINK, citizens of the United States, and residents of Lancaster, county of Fairfield, and State of Ohio, have jointly invented a new and useful Improvement in Baits for Drawing Glass, of which the following is a specification, the principle of the invention being herein explained and the best mode in which we have contemplated applying that principle, so as to distinguish it from other inventions.

The present invention relates as indicated to glass drawing mechanism, and more particularly to mechanism for drawing cylinders as in the prevailing method of manufacturing window glass. Said invention has regard among other things to the construction of the bait used in thus drawing glass cylinders, involving in this respect, certain improvements in the electrically heated glass bait that forms the subject matter of the copending application of R. L. Frink, filed May 20, 1909, Serial No. 497,274.

The object of the invention is the provision of a bait wherein the tendency of the cap or upper end of the drawn sheet or cylinder to break away from the bait, owing to the unequal rates of contraction of the material of the cylinder, namely glass, and that of the bait, which is preferably made of metal, is substantially wholly overcome. To this end the construction of the bait is made such, mechanically, as to permit it to contract and expand more or less freely with respect to the support by means of which it is raised from the bath of molten glass; while at the same time provision is made for the electrical heating of such bait so as to control, within prescribed limits, the range of temperature in the contacting portion or "novel" of the glass cylinder.

The present invention comprises, in addition to the foregoing, certain accessory or operative features of construction associated with the bait for raising and lowering the same and for supplying thereto the necessary heating, electrical current.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings:—Figure 1 is a front elevation of a bait embodying our present improvements along with the cage, from which such bait is suspended, and other accessory details; Fig. 2 is a plan view of the same; Fig. 3 is a side elevation thereof as viewed from the left in Fig. 1; Figs. 4, $4^a$, $4^b$, and $4^c$ are sectional views of details; Fig. 5 is a bottom plan view of the bait proper; Fig. 6 is a broken elevational view of the bait showing a modification in structure from that illustrated in Fig. 1; Fig. 7 is a bottom plan view of such modified form; Fig. 8 is a broken elevational view similar to Fig. 6 but showing other modifications in construction; Figs. 9 and 10 respectively show still other modifications in construction of the bait member proper; and Fig. 11 is a sectional view more or less diagrammatic in character illustrating such bait member proper with "novel" attached.

In Figs. 1, 2 and 3, the form of our improved bait there illustrated is shown in association with other portions of the glass drawing mechanism which, however, are so closely associated with the bait as to form in effect, for the present, purpose, a part thereof. This mechanism, as has been indicated, consisting primarily of a vertically reciprocable cage A from which the bait B is suspended, requires for obvious reasons, to be mounted over the drawing pot C, whereby pot is meant any suitable receptacle either movable or fixed in which is contained the bath of molten glass from which the cylinder is to be drawn. Two vertical ways or guides $a$ are accordingly provided for such cage, which is formed to engage therewith at its respective ends, and a cable $a'$ operated by a suitable hoisting mechanism at a proper rate of speed, is similarly provided in connection with the cage whereby it may be thus raised and lowered. In addition to the foregoing, two electric conductors in the form of trolley wires D are provided to the rear of the path of travel of the cage and parallel with said ways $a$.

In the approved construction illustrated, the cage comprises simply a frame made up of two transverse bars $a^2$ suitably joined together and braced by vertical bars $a^3$. Two intermediately positioned vertical bars $a^3$ are provided with forwardly projecting brackets $a^4$ in which are formed open trunnion bearings adapted to receive suitably formed lugs $b$ on two rod-like arms $b'$ that extend upwardly from the bait body. As a result of this construction, such body, it will be seen, is capable of oscillation in the plane of Fig. 3. Such oscillation, however, is limited in a rearward direction by a stop arm $a^5$ extending downwardly from the frame of the cage into position to be engaged by the body when occupying its normal pendent position. Lugs $b$ are adjustably held in the arms $b'$ between nuts $b^{14}$ (see Fig. 6).

To facilitate the removal and attachment of the bait, or other manipulation thereof, it is provided with two handles $b^2$, as shown in Figs. 1 and 3. The two brackets $a^4$ that thus serve to support the bait body are insulated from each other and from the frame of the cage, and are connected with the secondaries, or, in effect, themselves form continuations of the secondaries $x$ $x$ of two transformer coils $D'$ carried directly by the cage. The primaries $d'$ of such transformer lead to two trolley arms $d^2$ adapted to movably contact with the correspondingly disposed trolley wires. Variations in the coils themselves, whereby their transforming effect may be adjusted, is provided for by means of switches $d^3$ carried directly on the cage, while a rheostat $d^4$ is introduced into the circuit $D^2$ that includes the two trolley wires, so that the current supplied to the apparatus from the generator $D^2$ or other source of current, may also be varied in character.

The length of the ways $a$, between which the cage is thus movably supported, and of the trolley wires D, will of course, depend upon the length of cylinder which it is desired to draw. Such trolley wires, however, we prefer to have terminate at their lower ends short of the lower limit of movement of the cage, or rather of the trolley arms $d^2$ carried thereby; so that, in other words, such trolley arms and the transformer carried by the cage are disconnected from the electric circuit when such cage occupies its lowermost position in which the bait is brought into contact with the bath of molten glass in pot C. Preferably simply a breaker $d^6$ is introduced into each trolley wire, in order that the movement of the trolley arms may be in no wise interferred with, although various other means for interrupting the connection through the transformer on the cage will readily suggest themselves as a substitute for this.

Adverting next to the construction of the bait, the latter (in the form illustrated in Figs. 1 to 5, inclusive) will be seen to comprise a body portion of general cylindrical form which is preferably constructed of pieces of sheet metal riveted or otherwise securely fastened together. Such body carries the handles $b^2$ one on its top and the other on the side, to which reference has been previously made. Such top, or cover, may also be provided, if desired, with means, as an adjustable slide $b^3$ whereby an opening of variable area is formed therein. To the lower edge of the body portion is firmly riveted a flange $b^4$ of angular cross section, such flange preferably projecting outwardly from the body, and to said flange in turn is secured the bait member $b^5$ proper. The latter in the form illustrated in figures just named consists simply of an attenuated metal band or ribbon in the form of a continuous circle, to the upper edge of which are riveted, or better still welded, a series of bolts $b^6$. The threaded ends of the latter are secured to, but electrically insulated from the flange just described as being riveted to the lower edge of the bait body, as shown in the detail section of Fig. 4$^b$. The two arms $b'$ that extend upwardly from such body and pivotally support the same from the cage, are connected at their lower ends to diametrically opposite portions of this band, so as to have good electrical contact therewith, (see Fig. 4$^c$) but said arms are otherwise, like the band, entirely electrically insulated from the body, the clamps $b^7$ whereby they are secured to the latter having bushings $b^8$ of insulating material, as shown in Fig. 4$^a$.

It will thus be seen that when the bait is in its place suspended from the cage, and the trolley arms are in contact with the respective trolley wires, the electric circuit, including the dynamo and other generator is closed through transforming coils $D'$, the brackets $a^4$, arms $b'$, and the bait member connected with the lower ends of the latter. The current obviously divides and flows in multiple through such bait, but care is taken to have the respective portions thereof substantially equal in length and in cross section so that the heating effect of the current thus passed therethrough is substantially uniform throughout the whole circumferential extent of the band.

As a result of the manner in which the bait member proper, consisting in the form under consideration of thin metal band or ribbon is attached to the body portion of the bait, it will be obvious that such band is not only electrically insulated therefrom, but substantially heat insulated also, by reason of the relatively small heat conducting capacity of the spaced bolts or lugs $b^6$ that constitute the sole physical connection between such member and body portion.

Before proceeding to discuss fully the significance of the features of construction of the apparatus as thus far described, the several variant forms of the bait will be noted. Thus in Fig. 6, we illustrate in place of a plain metal band $b^5$ such as is shown in Fig. 5, a band $b^9$ of undulate, or corrugated form. Such a band, we have found will expand and contract more readily to suit itself to the varying demands occasioned by the changes in temperature to which it is subjected, than will the simple, plain form; and in fact, the latter after a period of use, assumes a crinkly form closely resembling that of Figs. 6 and 7. This is due to the stretching strain produced in the band when the cylinder "novel" is permitted to cool, owing to the inner portion of such "novel" setting with the band expanded somewhat beyond its normal circumference. The method of attachment of such undulate corrugated band is by means of lugs or bolts $b^6$, just as in the case of the first illustrated form. In the bait illustrated in Fig. 8, however, such bait being shown as of elongated instead of cylindrical form, we utilize in place of such bolts, a thin sheet $b^{13}$ of metal relatively thinner than the band used as a bait in the two forms just considered, and considerably thinner than the bait here utilized, for which we employ a more or less rigid ring $b^{10}$. The thin sheet of metal, that serves to connect the ring, thus constituting the bait member proper, with the lower edge of the body portion of the bait, is however, electrically insulated from the latter in a fashion analogous to that in which the bolts $b^6$ are insulated therefrom; and furthermore, there is considerable disparity in heat conducting capacity presented by such thin strip when compared with the bait proper. This disparity is still more emphasized in the form illustrated in Fig. 9, where the connecting sheet $b^{11}$ is perforated; as also in Fig. 10 where in place of a sheet a band $b^{12}$ of reticulated material, preferably wire netting, takes its place.

Having thus described the general structural features of our improved glass drawing mechanism with particular regard to details of the bait which constitutes the important feature of such mechanism, the method of operation of the apparatus may be next noted. The bait having been hung in the cage, is preliminarily adjusted so that the bait member lies perfectly horizontal. This adjustment is effected in a plane parallel with the axis of the bait by raising or lowering the position of lugs $b$ on the upper end of the rods or arms $b'$ so as to correspondingly raise or lower the opposite sides of the bait member to which such arms are attached. A symmetrical distribution of the weight of the bait as a whole about its axis serves to level up such bait in a transverse plane, and if necessary additional weight may be attached on one side or the other to secure this result.

The cage is permitted to descend until the lower edge of the bait dips into the bath of glass in the drawing pot or receptacle C. In order that the glass may readily cling to the bait it is best that the latter be not raised immediately to a higher temperature than that of the atmosphere. The current is accordingly preferably not turned on until after this stage of operation is passed and the bait with attached glass cylinder, or "roller" has been raised through such a distance as will permit the "novel" and inclosed bait member to drop to a temperature just above the second point of tension in the glass. In practice the current is indeed turned on by closing switch $d^8$, but despite the turning on of such current, it does not pass through the bait when in its lowermost position, for the reason that the trolley arms are not in contact with the live portions of the trolley wires. Such contact does not occur until the carriage with the bait begins to rise, so as to carry said arms past breakers $d^6$, or from the dotted to the full line position, as shown in Fig. 3. The distance through which the bait thus is permitted to rise before the current is turned on, is a matter for calculation and empirical adjustment, it being our object to allow the "novel", or mass of glass that clings to the bait, to cool down to substantially the temperature at which it is desirably maintained during the remainder of the draw, before any artificial heating of the bait be attempted. As previously stated, the temperature at which we thus contemplate maintaining the bait during the draw, is above the second point of tension in the glass, that is above the point where the glass comes to a set; glass men generally speaking of glass as having two points of tension, the first point being from 1200 to 1400 degrees, Fahrenheit, where devitrification or crystallization takes place, and the second being in the neighborhood of 900 degrees, Fahrenheit. The volume and character of the current that is passed through the bait is accordingly regulated, having due regard to the electrical resistance of the latter, so as to maintain said bait at a temperature above such last-named point, and thus enable the glass in the novel immediately contacting with the bait to accommodate itself without rupture to any relative displacement of said member incident to a change in their common temperature. This regulation of the electric circuit, and thus of the temperature, is effected, in the first place, by adjusting the transformer coil connection by means of switches $d^3$, so as to provide with the current available in the main line, a current in the secondaries, which includes in circuit therewith the bait member proper, current appropriate to the size of the bait, or in other words, the size of the sheet or cylinder being drawn. For varying the current during any particular drawing operation, with the transformer coils thus adjusted, the rheostat $d^4$ is utilized. In place of relying on automatic means for determining when the current shall begin to pass through the bait upon its upward movement, after dipping in the bath of molten glass, the rheostat and switch in the main circuit may be relied on, and the use of breakers $d^6$, or equivalent means, dispensed with.

While we have illustrated (see Fig. 8) but a single form of bait as adapted to a longitudinally extended support or body member as distinguished from a cylindrical one, it will, of course, be understood that any one of the several forms of such bait member is equally susceptible of being used with a straight body as with a cylindrical body, and as illustrated in said Fig. 8, the arms which serve to attach the bait, are of the same form and disposition whichever type of body is utilized. The advantages, moreover, of our improved method of electrically heating the bait so as to control its temperature, will obviously be found in the same degree where such longitudinally extending bait member is employed, as in the case of the cylindrical member used in drawing rollers as distinguished from sheets.

The diagrammatic sectional view of the bait member with novel attached, shown in Fig. 11, is designed to render clear the effect of changing temperatures in this portion of the cylinder, or sheet, of glass being drawn, as the case may be, and thus the significance of our improved method of controlling such temperatures rendered possible by the apparatus hereinbefore described. The section of the bait member therein appearing, is shown as inclosed to approximately the degree actually found in practice by the glass forming the upper end or novel of the cylinder. Of course, both this member and the novel will initially, that is when the member is dipped into the bath of molten glass, have approximately the same temperature as that of such bath. Immediately, however, the drawing process proper is begun, the member and the novel begin to lose heat by radiation and convection, and in a limited degree, by conduction through the bolts, rivets, or equivalent means whereby the member is attached to the body portion of the bait. It has been explained, however, that this latter form of loss is reduced to a minimum by the construction of such attaching means. The variation in temperatures at different portions of the member and of the novel, at one stage of such cooling process, are represented on the figure in question. As such cooling progresses, a corresponding change occurs in the cubical contents of three-way dimensions of both the bait member and the novel, but owing to the different materials of which these are respectively composed, the band constituting the member will tend to contract more than the glass. The inner portion of the novel, is, hence, put under a compression strain and the outer portion under a tension strain, which strains if allowed to become too great produce a rupture of the point of attachment of the novel to the bait. This tendency to rupture, it has been explained, is avoided by maintaining the temperature of the bait and the attached glass above the point at which such strains are present to a harmful degree, and in this way the glass is maintained in adhesive and cohesive contact with the bait member. This very tendency to rupture, however, upon allowing the temperature of bait and novel to fall below such pre-determined point, we utilize to sever the cylinder from the bait upon the conclusion of the drawing operation. In other words, it is a matter of but a relatively few moments after the current is turned off through the bait, before the cylinder will snap off from the bait, and by properly controlling the resulting fracture, the rather difficult task of severing the cylinder from the bait, involved in the prevailing practice, is easily accomplished.

In conclusion, it may be remarked that the function of the slide $b^3$ for providing an adjustable opening in the body portion of the cylindrical bait is to permit regulation of the escape of the air from within the roller. This air is designed to be supplied, in the apparatus herein illustrated, through a supply pipe $c$ that rises centrally in the drawing receptacle and is closed at its upper end by a laterally perforated cap $c'$. The provision of an opening, whether thus adjustable or not, is of more significance in the case of a cylindrical bait where the space between the body and the bait member is closed as illustrated in connection with a straight, or elongated bait in Fig. 8. This opening is provided for the purpose of regulating the escape of a predetermined volume of pressure medium in order to accomplish the results attained by the construction disclosed in Patent 963,888 granted July 12th, 1910 to R. L. Frink, so that the strain on the interior wall of the cylinder may more nearly approach those of the exterior wall, which strains are produced by the heat loss from such walls. Thus, for example, the air may be supplied at the upper end of the roller, instead of at the lower end, and other changes made in the manner in which the air is supplied, as explained in U. S. Patent No. 915,282 dated March 16, 1909, wherein an earlier electrically heated bait is shown.

Other modes of applying the principle of our invention may be employed instead of the one explained, change being made as regards the mechanism herein disclosed, provided the means stated by any one of the following claims or the equivalent of such stated means be employed.

We therefore particularly point out and distinctly claim as our invention:—

1. In glass drawing mechanism, the combination of a pot adapted to hold a bath of molten glass; a bait movable toward and from said pot; an electric generator; and connections, including a movable contact member, whereby an electric current may be passed through said bait as it is thus moved.

2. In glass drawing mechanism, the combination of a pot adapted to hold a bath of molten glass; a bait movable toward and from said pot; transformer coils located on a drawing support and connected with the bait; an electric generator; and connections, including a movable contact member, whereby an electric current may be passed through said transformer coils and bait as the latter is thus moved.

3. In glass drawing mechanism, the combination of a pot adapted to hold a bath of molten glass; a bait movable toward and from said pot; transformer coils located on the drawing support and connected with bait; an electric generator; connections, including a movable contact member whereby an electric current may be passed through said transformer coils and bait as the latter is thus moved; and means associated with said coils adapted to adjust the same to vary their transforming effect.

4. In glass drawing mechanism, the combination of a pot adapted to hold a bath of molten glass; a bait movable toward and from said pot; transformer coils located on the drawing support and connected with the bait; an electric generator; connections, including a movable contact member whereby an electric current may be passed through said transformer coils and bait as the latter is thus moved; and rheostat means, apart from said bait and transformer coils, for varying the current supplied to the latter.

5. In glass drawing mechanism, the combination of a pot adapted to hold a bath of molten glass; a bait movable toward and from said pot; transformer coils located on the drawing support and connected with the bait; an electric generator; connections, including a movable contact member whereby an electric current may be passed through said transformer coils and bait as the latter is thus moved; rheostat means, apart from said bait and transformer coils, for varying the current supplied to the latter; and means associated with said coils adapted to adjust the same to vary their transforming effect.

6. In glass drawing mechanism, the combination of a pot adapted to hold a bath of molten glass; a bait movable toward and from said pot; transformer coils located on the drawing support and connected with the bait; an electric generator; and connections, controlled by the movement of said bait, whereby an electric current may be passed through the same during a predetermined portion only of its movement.

7. In glass drawing mechanism, the combination of a pot adapted to hold a bath of molten glass; a bait movable toward and from said pot; transformer coils located on the drawing support and connected with the bait; an electric generator connections, including a movable contact member whereby an electric current may be passed through said transformer coils and bait as the latter is thus moved; an electric generator; and connections, whereby an electric current may be passed through said bait, said connections being controlled by the movement of bait, so as to permit the current to pass only after the latter has been raised a predetermined distance above the metal in said pot.

8. In glass drawing mechanism, the combination of a pot adapted to hold a bath of molten glass; a bait movable toward and from said pot; transformer coils located on the drawing support and connected with the bait; an electric generator; and connections including a conductor parallel with the path of movement of said bait and a contact member movable with and connected to said bait, said conductor being discontinuous so as to permit the current to thus pass during a predetermined portion only of the bait's movement.

9. In glass drawing mechanism, the combination of a pot adapted to hold a bath of molten glass; a bait movable toward and from said pot; transformer coils located on the drawing support and connected with the bait; an electric generator; and connections including a conductor parallel with the path of movement of said bait and a contact member movable with and connected to said bait, said conductor terminating short of the lower end of said contact member's range of movement so as to permit the current to pass only after the bait has been raised a predetermined distance above the metal in said pot.

10. In glass drawing mechanism, the combination of a pot adapted to hold a bath of molten glass; a vertically movable cage located thereover; a bait removably suspended from said cage; an electric generator; a conductor connected therewith and disposed parallel with the path of travel of said cage; and a contact member carried by the latter and connected with said bait, whereby an electric current may be passed through said bait as it is thus moved.

11. In glass drawing mechanism, the combination of a pot adapted to hold a bath of molten glass; a vertically movable cage located thereover; a transformer carried by said cage, the secondaries of said transformer terminating in brackets; a bait removably, pivotally suspended from said brackets; an electric generator; a conductor connected therewith and disposed parallel with the path of travel of said cage; and a contact member carried by the latter and connected with said bait, whereby an electric current may be passed through said bait as it is thus moved.

12. In glass drawing mechanism, the combination of a pot adapted to hold a bath of molten glass; a vertically movable cage located thereover; a bait removably suspended from said cage; an electric generator; a conductor connected therewith and disposed parallel with the path of travel of said cage; and a contact member carried by the latter and connected with said bait, whereby an electric current may be passed through said bait as it is thus moved, said conductor being discontinuous so as to permit the current to pass through said transformer and bait during a predetermined portion only of the latter's movement.

13. In glass drawing mechanism, the combination of a pot adapted to hold a bath of molten glass; a vertically movable cage located thereover, a transformer carried by said cage, the secondaries of said transformer terminating in brackets; a bait removably, pivotally suspended from said brackets; an electric generator; a conductor connected therewith and disposed parallel with the path of travel of said cage; and a contact member carried by the latter and connected with said bait, whereby an electric current may be passed through said bait as it is thus moved, said conductor terminating short of the lower end of said contact member's range of movement, so as to permit the current to pass through said transformer and bait only after the latter has been raised a predetermined distance above the metal in said pot.

14. In a bait for drawing glass cylinders, the combination of a hollow substantially cylindrical body portion closed at its upper end, and an annular bait member, proper, attached to the open end of said body portion.

15. In a bait for drawing glass cylinders, the combination of a hollow substantially cylindrical body portion closed at its upper end, but provided with an adjustable aperture, and an annular bait member proper attached to the open end of said body portion.

16. In a bait for drawing glass cylinders, the combination of a substantially cylindrical body portion, an annular bait member proper, attached to but electrically insulated from the lower end of said body portion, and supporting arms for said body portion connected with said bait member so as to conduct an electric current thereto, said arms being also insulated from said body portion.

17. In a bait for drawing glass cylinders, the combination of a substantially cylindrical body portion; a corrugated metallic band constituting the bait member proper; and means of relatively less heat conducting capacity securing said band to said body portion.

18. In a bait for drawing glass cylinders, the combination of a substantially cylindrical body portion; a corrugated metallic band constituting the bait member proper; means of relatively less heat conducting capacity securing said band to said body portion; and connections for passing a heating electric current through said band.

19. In a bait for drawing glass cylinders, the combination of a substantially cylindrical body; a flexible corrugated metallic band, constituting the bait member proper, secured at spaced points along one edge to said body, whereby the intermediate portions of said band are left free to move relatively to each other and to said body; and connections for passing a heating electric current through said band.

20. In glass drawing mechanism, the combination of a pot adapted to hold a bath of molten glass; a bait movable toward and from said pot; an electric generator; transformer coils movable along with said bait; and connections whereby an electric current may be passed through said transformer coils and bait as the latter is thus moved.

21. In glass drawing mechanism, the combination of a pot adapted to hold a bath of molten glass; a bait movable toward and from said pot; an electric generator; transformer coils movable along with said bait; connections whereby an electric current may be passed through said transformer coils and bait as the latter is thus moved; and means associated with said coils adapted to adjust the same to vary their transforming effect.

22. In glass drawing mechanism, the combination of a pot adapted to hold a bath of molten glass; a bait movable toward and from said pot; an electric generator; transformer coils movable along with said bait; connections whereby an electric current may be passed through said transformer coils and bait as the latter is thus moved; and rheostat means, apart from said bait and transformer coils, for varying the current supplied to the latter.

23. In glass drawing mechanism, the combination of a pot adapted to hold a bath of molten glass; a bait movable toward and from said pot; an electric generator; transformer coils movable along with said bait; connections whereby an electric current may be passed through said transformer coils and bait as the latter is thus moved; rheostat means, apart from said bait and transformer coils for varying the current supplied to the latter; and means associated with said coils adapted to adjust the same to vary their transforming effect.

24. In glass drawing mechanism, the combination of a pot adapted to hold a bath of molten glass; a vertically movable support located thereover; and a bait, having a substantially circular contact edge, pivotally attached to said support so as to be oscillatory about an axis transverse to said support's direction of movement.

25. In glass drawing mechanism, the combination of a pot adapted to hold a bath of molten glass; a vertically movable support located thereover; a bait, having a substantially circular contact edge, pivotally attached to said support so as to be oscillatory about an axis transverse to said support's direction of movement; and means limiting the oscillation of said bait.

26. In glass drawing mechanism, the combination of a pot adapted to hold a bath of molten glass; a vertically movable support located thereover and provided with transversely alined brackets; and a bait, having a substantially circular contact edge, pivotally suspended from said brackets.

27. In glass drawing mechanism, the combination of a pot adapted to hold a bath of molten glass; a vertically movable support located thereover and provided with transversely alined brackets; a bait, having a substantially circular contact edge, pivotally suspended from said brackets; and a stop arm extending downwardly from said support and adapted to limit the oscillation of said bait in one direction.

28. In glass drawing mechanism, the combination of a pot adapted to hold a bath of molten glass; a vertically movable support located thereover; and a bait, pivotally attached to said support so as to be oscillatory about an axis transverse to said support's direction of movement; the opposite sides of said bait being independently adjustable with respect to such axis.

29. In glass drawing mechanism, the combination of a pot adapted to hold a bath of molten glass; a vertically movable support located thereover; and a bait, having a substantially circular contact edge, pivotally attached to said support so as to be oscillatory about an axis transverse to said support's direction of movement, the opposite sides of said bait being independently adjustable with respect to such axis.

30. In glass drawing mechanism, the combination of a pot adapted to hold a bath of molten glass; a vertically movable support located thereover and provided with transversely alined brackets; a bait having a substantially circular contact edge, and means attached to opposite sides of said bait for pivotally suspending the same from said brackets, said means being independently adjustable to raise or lower such sides as desired.

31. In glass drawing mechanism, the combination of a pot adapted to hold a bath of molten glass; a vertically movable support located thereover and provided with transversely alined brackets; formed with open trunnion bearings; a bait, comprising a substantially cylindrical body and a bait member proper secured to the lower edge of said body; arms laterally attached to said body; and lugs on the upper ends of said arms adapted to be received in bearings in said brackets.

32. In glass drawing mechanism, the combination of a pot adapted to hold a bath of molten glass; a vertically movable support located thereover and provided with transversely alined brackets; formed with open trunnion bearings; a bait, comprising a substantially cylindrical body and a bait member proper secured to the lower edge of said body; arms laterally attached to said body; and lugs, adjustably mounted on the upper ends of said arms, adapted to be received in the bearings in said brackets.

33. In glass drawing mechanism, the combination of a pot adapted to hold a bath of molten glass; a vertically movable cage located thereover and provided with transversely alined brackets adapted to be connected in an electric circuit, said brackets being formed with open trunnion bearings; a bait comprising a substantially cylindrical body and a bait member proper secured to the lower edge of said body but insulated therefrom, said arms being connected at their lower ends with opposite sides of said bait member; and lugs on the upper ends of said arms, adapted to be received in the bearings in said brackets.

34. In glass drawing mechanism, the combination of a pot adapted to hold a bath of molten glass; a vertically movable cage located thereover and provided with transversely alined brackets adapted to be connected in an electric circuit, said brackets being formed with open trunnion bearings; a bait comprising a substantially cylindrical body and a bait member proper secured to the lower edge of said body but insulated therefrom, said arms being connected at their lower ends with opposite sides of said bait member; and lugs, adjustably mounted on the upper ends of said arms, adapted to be received in the bearings in said brackets.

Signed by us this 2nd day of March, 1910.

ROBERT L. FRINK.
FRED. J. FRINK.

Attested by—
F. M. ACTON,
HAZEL STEVENSON.